United States Patent
Rowley et al.

(10) Patent No.: US 7,991,387 B2
(45) Date of Patent: Aug. 2, 2011

(54) METHOD FOR MOBILE TELECOMMUNICATION SECURITY IN A MOBILE COMMUNICATION NETWORK AND DEVICE THEREFOR

(75) Inventors: Mark Rowley, Staines (GB); Chen-Ho Chin, Staines (GB)

(73) Assignee: Samsung Electronics Co., Ltd (KR)

(*) Notice: Subject to any disclaimer, the term of this patent is extended or adjusted under 35 U.S.C. 154(b) by 638 days.

(21) Appl. No.: 12/064,921

(22) PCT Filed: Aug. 25, 2006

(86) PCT No.: PCT/KR2006/003362
§ 371 (c)(1),
(2), (4) Date: Sep. 2, 2008

(87) PCT Pub. No.: WO2007/024121
PCT Pub. Date: Mar. 1, 2007

(65) Prior Publication Data
US 2009/0017863 A1   Jan. 15, 2009

(30) Foreign Application Priority Data
Aug. 26, 2005   (GB) .................................. 0517484.2

(51) Int. Cl.
*H04M 1/66* (2006.01)
(52) U.S. Cl. ............... 455/411; 455/422.1; 455/425; 455/435.1; 713/170

(58) Field of Classification Search .......... 455/410–411, 455/550.1–553.1, 425; 713/168, 169, 170
See application file for complete search history.

(56) References Cited

U.S. PATENT DOCUMENTS

| | | | |
|---|---|---|---|
| 2002/0066011 A1* | 5/2002 | Vialen et al. | 713/150 |
| 2004/0137876 A1 | 7/2004 | Fisher et al. | |
| 2004/0229597 A1 | 11/2004 | Patel | |
| 2005/0048971 A1* | 3/2005 | Findikli et al. | 455/435.1 |

FOREIGN PATENT DOCUMENTS

| | | |
|---|---|---|
| KR | 1020040098534 | 11/2004 |
| RU | 2 150 790 | 6/2000 |
| WO | WO 2004/073347 | 8/2004 |

OTHER PUBLICATIONS

Int'l Search Report (PCT/ISA/210) (3 pp), Dec. 11, 2006.
Written Opinion of Int'l Search Authority (PCT/ISA/237) (5 pp), Dec. 11, 2006.

* cited by examiner

*Primary Examiner* — Kamran Afshar
(74) *Attorney, Agent, or Firm* — The Farrell Law Firm, P.C.

(57) ABSTRACT

A method of operating a mobile communication device in a mobile telecommunication network, the method comprising the steps of the mobile communication device: receiving a non integrity-protected message with a parameter value included therein to be implemented on the mobile communication device; using a predetermined value stored on the mobile communication device instead of the parameter value received.

8 Claims, 5 Drawing Sheets

UTRAN  UMTS Terrestrial Radio Access Network
CN     Core Network
UE     User Equipment

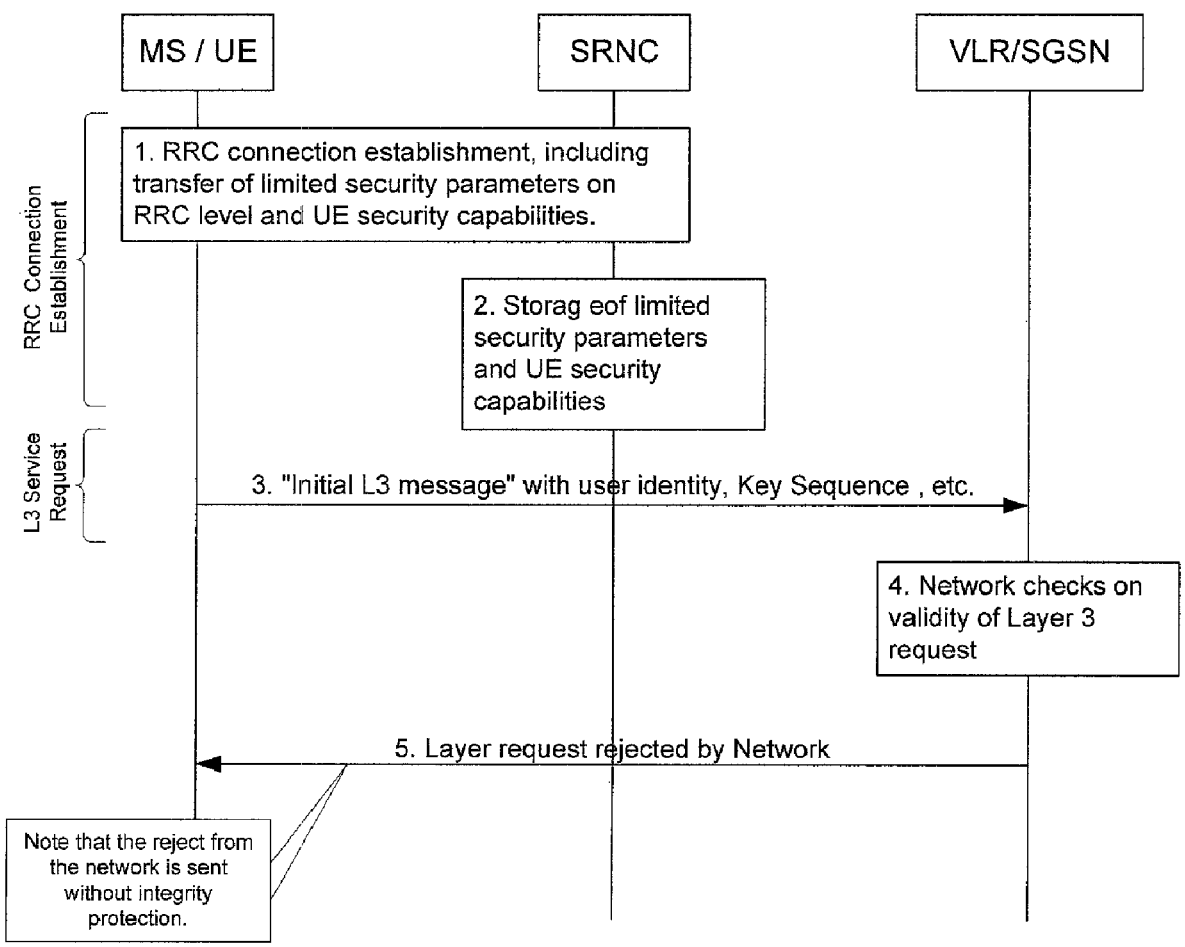

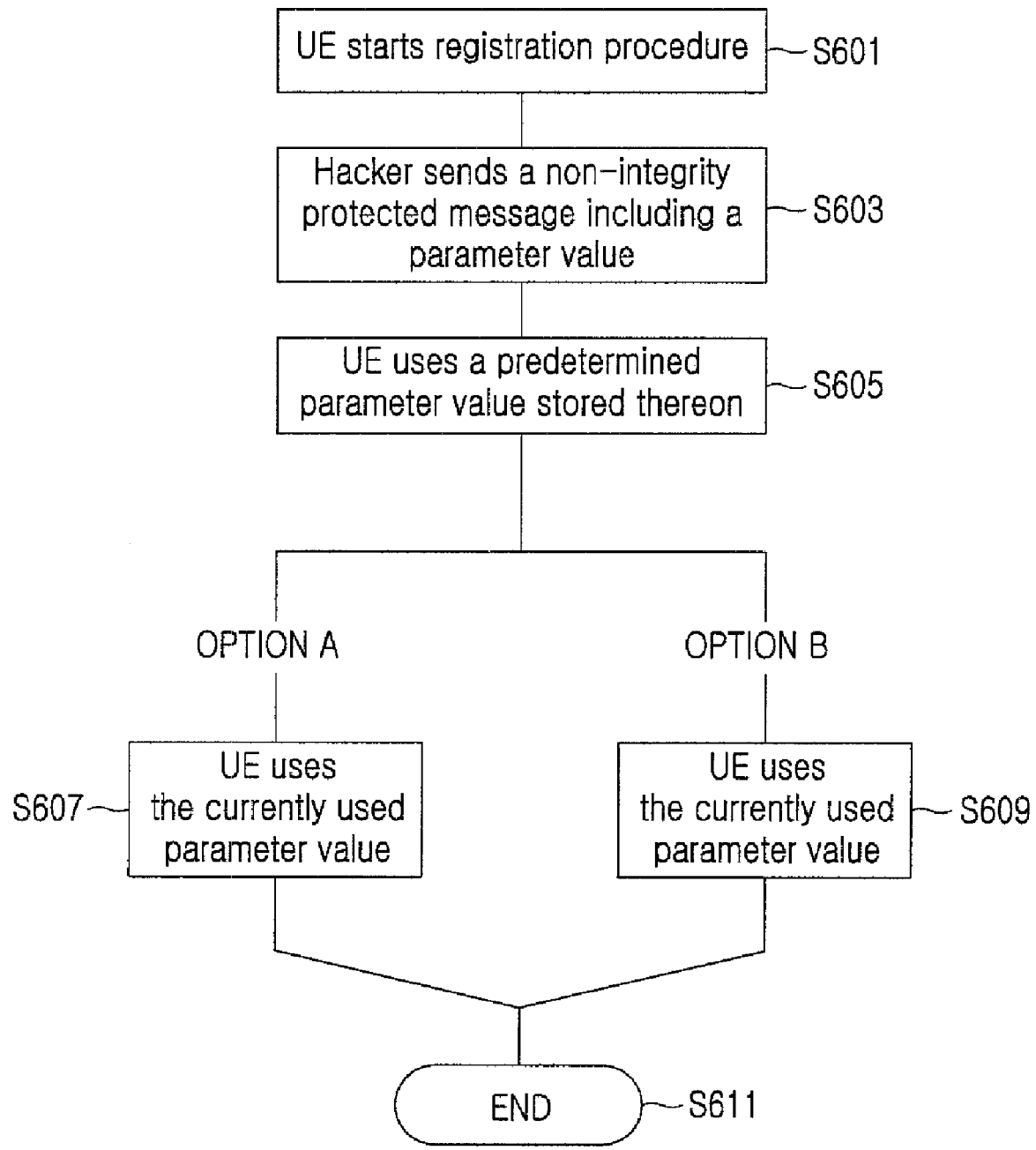

METHOD FOR MOBILE TELECOMMUNICATION SECURITY IN A MOBILE COMMUNICATION NETWORK AND DEVICE THEREFOR

PRIORITY

This application claims priority to U.K. Appl. No. 0517484.2, filed Aug. 25, 2005, and to PCT application number PCT/KR2006/003362, filed Aug. 25, 2006, the entire disclosure of each of which is incorporated herein by reference.

TECHNICAL FIELD

The present invention relates to mobile telecommunications, and in particular to an improvement in security issues relating to non secure air interface messages transmitted to a mobile communication device over the mobile telecommunication network.

BACKGROUND ART

The present application is not limited to Universal Mobile Telecommunications Systems (UMTS), and can be equally applied to Global System for Mobile communication/General Packet Radio Service networks (GSM/GPRS), or indeed any other telecommunication networks.

A typical architecture of a cellular radio system like the Universal Mobile Telecommunications System (UMTS) is shown in FIG. 1. The UMTS comprises mobile user equipment (UE), a radio access network (RAN) and one or more core networks (CNs). UMTS is a third generation radio system using wideband code division multiple access (W-CDMA) technology.

FIG. 2 shows a more detailed architecture of a radio access network comprising base stations and radio network/base station controllers (RNC/BSC). The base stations handle the actual communication across the radio interface, covering a specific geographical area also referred to as a cell. Besides controlling the base stations connected to it, the RNCs include functionality such as the allocation of radio resources, local mobility etc. An RNC connects:

to one or more core networks via the Iu interface,
to a number of base stations (node B's for the case of UTRAN) via the Iub interface and
possibly to one or more other RNCs via the Iur interface FIG. 3 provides an overview of the UE registration and connection principles within UMTS with a Circuit Switched (CS) service domain and a Packet Switched (PS) service domain. Further details for this can be found on the 3rd Generation Partnership Project (3GPP) website at http://www.3gpp.org/ in document "3GPP TS 33.102 Security Architecture". User (temporary) identification, authentication and key agreement takes place independently in each service domain. User plane traffic is ciphered using the cipher key agreed for the corresponding service domain while control plane data is ciphered and integrity protected using the cipher and integrity keys from either one of the service domains.

The CS and PS domains individually and asynchronously establish a its security context with the peer sides of the UE. This security context can be considered, in its simplest form, to be established by running an Authentication procedure that generates the security keys associated and belonging to that Security Context. The Authentication procedure is optional and its execution is a decision of the network. The Authentication procedures, and the Security Context resulting from it, do not ensure security of the radio interface. To ensure security of the radio interface, it is required that the Security Setting procedure is executed. The Security Setting procedure ensures that any messages sent via the air interface are secure.

FIG. 4 provides a brief simplified illustration of the protocol sequence of events that happen for a normal Layer 3 request for service. The far left of FIG. 4 provides a view of the sequence of procedures that lead up to the setting of Integrity and thus ensuring the "over-the-air" (OTA) signalling messages are fully secured. Up until this security setting procedure is complete, and the integrity protection is activated, the OTA messages are not secure.

At step 1, the UE and the Service Radio Network Controller (SRNC) establish an RRC connection. This includes a transfer of limited security parameters at the RRC level and UE security capabilities. At step 2 the SRNC stores limited security parameters and UE security capabilities. At step 3, an "initial layer 3 (L3) message" with user identity, key sequence etc is sent to the visitor location register/serving GPRS support node (VLR/SGSN).

In return, at step 4, the VLR/SGSN forwards an authentication key generation to the UE. Step 4 is an optional step, which may or may not be run by the network. At step 5 a decision is made by the VLR/SGSN on the integrity and encryption required. At step 6, the VLR/SGSN requests the setting of security by sending a message to the SRNC. At step 7 the SRNC initiates the security procedures by sending a message to the UE. The security procedures are completed by the UE by sending a message back to SRNC at step 8. At step 9 the SRNC sends a further message back to the VLR/SGSN to complete the security settings. At step 10 the layer 3 services may proceed between the UE and the SGSN.

Further details can be found in 3GPP TS 24.008 Mobile radio interface Layer 3 specification; Core network protocols; Stage 3, and 3GPP TS 25.133 Radio Resource Control (RRC) protocol specification, both of which may be found at the 3rd Generation Partnership Project (3GPP) website at http://www.3gpp.org/.

In FIG. 4 it is highlighted that step 4, the Authentication procedure, is an optional procedure. The Network decides whether this should be run based on several parameters beyond the scope of this description. However, it should be noted that regardless of whether the Authentication is run by the network, the Security Setting procedure that turns on the integrity protection of the OTA (Over the Air) messages can still take place so long as a security context exist between the UE and the network.

FIG. 5 shows the protocol sequence of events for a Layer 3 request that is not accepted (and thus rejected) by the network. This reject sequence is the same regardless of whether the Layer 3 service requested is for establishing calls or sessions or for registering the UE to the network.

At step 1, the UE and the Service Radio Network Controller (SRNC) establish an RRC connection. This includes a transfer of limited security parameters at the RRC level and UE security capabilities. At step 2 the SRNC stores limited security parameters and UE security capabilities. At step 3, an "initial layer 3 (L3) message" with user identity, key sequence etc is sent to the visitor location register/serving GPRS support node (VLR/SGSN).

At step 4, the VLR/SGSN checks the validity of the layer 3 request. If the request is not acceptable, the VLR/SGSN rejects the request at step 5. This request rejection is sent over the network to the UE without integrity protection.

Based on the above-described system, it is possible for a hacker, or, in the words of Universal Mobile Telecommunications System (UMTS) lingo a "False Basestation", to instigate service attacks against UEs by providing false information within non integrity-protected messages sent over the air interface to the mobile communication device. These attacks can cause a "Denial Of Service" (DoS) to the mobile user.

Incorporated within the UMTS, and GSM/GPRS before it, is a timer within the UE that inhibits subsequent automatic registration attempts to the PS domain following the abnormal failure of a registration procedure. This timer is designated in the system as timer T3302.

T3302 has a default value of 12 minutes, which is used from power on until a different value for the parameter is assigned. The UE can be assigned a different value for T3302 in the ATTACH_ACCEPT, ATTACH_REJECT, ROUTING_AREA_UPDATE_ACCEPT and ROUTING_AREA_UPDATE_REJECT messages.

The value assigned to T3302 is between 2 seconds and 3 hours 6 minutes. Alternatively, the T3302 parameter can be indicated as 'deactivated'. The consequence of setting T3302 to 'deactivated' is that further registration attempts to the PS domain following the 'abnormal failure' of a registration procedure are disabled.

An 'abnormal failure' is defined as follows. When the network rejects the mobile NAS Layer 3 request, the network provides a reason in the system this is called the Reject Cause. This Reject Cause will inform the UE what next action the UE shall, should or may take. If a Reject Cause is not understood by a UE, the cause is termed an Abnormal Case and failures resulting from these are termed abnormal failures. Abnormal Cases also cover a) Lower Layer (ie. radio failures) b) Procedure timeout (ie. no response from CN) c) CN rejection for a reason that is not expected by the UE (for example, if a legacy UE is active in a later release of a network, for instance a CN of Release 98 sends a new Reject Cause #14 to a UE which is built to GSM Phase 2 Specifications).

If no further registration attempts are allowed, the UE is denied service until one of following actions occurs:

a) a manual request is triggered by the User (for example, a manual request for PS services), or b) the UE goes through a power cycle (that is, the user powers the unit down and then switches the unit back on), or c) there is a physical change of Routing Area (for example, the UE moves from one cell to another).

The UE uses the T3302 default value from power on and continues to use the default value until it is assigned a different value.

A further problem can exist for UEs that are already registered to the network. That is, an increase in the number of network registration attempts by individual UEs not yet registered can result in an increase in radio noise for those UEs already registered. Also, a loss of service may occur for the UEs already registered due to this increase in noise and/or a loss of bandwidth due to the large number of requests for registration.

The dangers of unprotected over-the-air (OTA) messages are known. Thus in addition to encryption protection, the UMTS has integrity protection designed into it. Further, the UMTS has stringent authentication rules and elaborate integrity and encryption algorithms and also checks to allow the mobile to verify the network is genuine. Examples of these security aspects can be found on the 3rd Generation Partnership Project (3GPP) website at http://www.3gpp.org/ in documents TS 33.102 and 24.008.

In order to secure OTA messages in UMTS the integrity protection must be executed. The integrity protection starts after the Authentication and Key Agreement (AKA) procedure is optionally run. Although it is not necessary to run the AKA every time the UE accesses the network, the integrity protection must be started at the earliest possible opportunity every time the UE accesses the network. Security aspects in UMTS can therefore only be applied once the network and the UE run the integrity protection, and thus make OTA messages secure.

In UMTS integrity protection is triggered by the Core Network (CN) once the CN has received and processed the very first NAS (Non-Access Stratum) Layer 3 message and finds the NAS layer 3 request to be acceptable the CN proceeds further with that NAS Layer 3 request. If the CN finds the UE's first NAS Layer 3 request message unacceptable the CN rejects the UE by sending a reject message in the form of either an ATTACH_REJECT or ROUTING_AREA_UPDATE_REJECT message. The security procedure that triggers integrity protection of OTA messages is not started, because it is thought that, if the CN is rejecting a service request, enabling security is unnecessary as the UE-network transaction is expected to be terminated. This means that OTA reject messages to the mobile that are not Integrity protected are unsecured.

Further, it is possible for the T3302 timer parameter in the reject messages ATTACH_REJECT and ROUTING_AREA_UPDATE_REJECT to be manipulated in order to instigate a Denial of Service attack against the UE. This could be possible by intercepting the reject messages from the network and subsequently corrupting the T3302 timer parameters. However, it is more likely that a potential hacker would construct an entirely false reject message (ATTACH_REJECT or a ROUTING_AREA_UPDATE_REJECT) and send it to the UE.

Therefore, a hacker can instigate a Denial of Service attack against any UMTS mobile by manipulating parameters in the ATTACH_REJECT or ROUTING_AREA_UPDATE_REJECT messages that are not Integrity protected.

In the worst case, as explained above, this Denial of Service attack can lock mobiles out of PS services until the UE physically moves, the user triggers a specific request for PS services or the user carries out a power reset.

In GSM/GPRS and UMTS up to Release 5, the system has been designed with a process loop whereby a registration procedure attempt that fails abnormally will be repeated. Registration repeats are controlled by timers (other than T3302) and the movement of the UE within the Network. A UE shall attempt the registration procedure 5 times before T3302 is started.

Therefore, up to UMTS Release-5 there is statistically more than a good chance that any Registration Reject and its information, if corrupted by a hacker, will be updated by the next genuine Registration Reject or made irrelevant by a successful registration or registration update. However, the network does not necessarily refresh any corrupted parameters in T3302, as it is optional for the network to provide a parameter for T3302. Furthermore, a network cannot determine if a hacker has previously provided a corrupt value for T3302. So a corrupted T3302 that is not updated will be applied when the repetition of the registration procedure comes to an end. Also, the corrupted T3302 will be used the next time the mobile gets to a situation where T3302 has to be started again.

One problem with this existing solution is that, given that each occurrence of an abnormal condition counts as a failure to a registration procedure attempt, a hacker can, by 'forcing'

5 successive occurrences of abnormal failures, bring an end to the entire registration procedure process loop and so cause T3302 to be started.

The above-described problem is exacerbated by a change to Release 6 of the NAS specification by the introduction of a means to by-pass the existing solution. In UMTS Release 6, the same implicit solution of repeating the registration procedure 5 times exists prior to starting timer T3302. So there is an equally good chance of a genuine network updating a corrupted T3302 parameter. However, similar to Pre-Release 6, there is no guarantee that the network will update T3302 and the network does not know a hacker has corrupted T3302.

Also, changes to Release 6 of the NAS specification allow the repeating registration procedure loop to immediately end if certain Reject Causes are received by the UE. The changes to Release 6 can be found in Tdoc N1-041602 at the 3GPP website indicated above.

Therefore, a hacker can not only corrupt the system value of T3302 but also provide a Reject Cause that forces the mobile to stop further automatic registration attempts until the corrupted T3302 is changed.

DISCLOSURE OF INVENTION

Technical Problem

The present invention aims to overcome or at least alleviate some or all of the aforementioned problems.

Technical Solution

In one aspect, the present invention provides a method of operating a mobile communication device in a mobile telecommunication network, the method comprising the steps of the mobile communication device: receiving a non integrity-protected message with a parameter value included therein to be implemented on the mobile communication device; using a predetermined value stored on the mobile communication device instead of the parameter value received.

In a further aspect, the present invention provides a method of communicating over a mobile communication network using an air interface to communicate with a mobile communication device, in which integrity-protected and non integrity-protected messages are transmitted to the mobile communication device, said messages including parameter values to be implemented at the mobile communication device, the method comprising the step of: ensuring the mobile communication device uses a valid value for the parameter, the valid value allowing communication over the network to continue.

Advantageous Effects

The present invention provides an easy to implement yet effective method of preventing a denial of service attack on UEs.

BRIEF DESCRIPTION OF THE DRAWINGS

Specific embodiments of the present invention will now be described by way of example only, with reference to some of the accompanying drawings, in which:

FIG. 5 shows the known sequence of events leading up to a network rejecting a UEs layer 3 service access request;

FIG. 6 shows a flow chart depicting the steps taken to implement embodiment one of the present invention.

BEST MODE FOR CARRYING OUT THE INVENTION

First Embodiment

Figure 1:
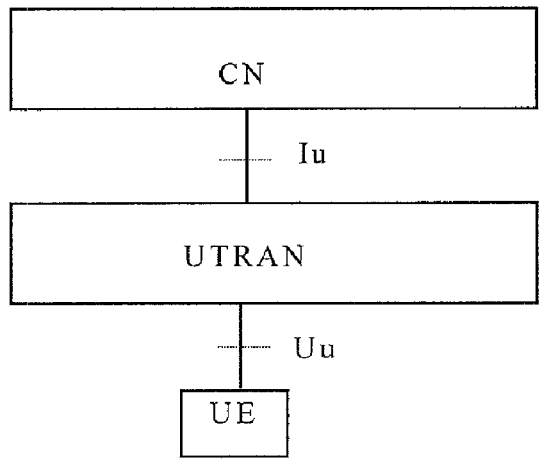
FIG. 1 shows a typical architecture of a known cellular network.
Figure 2:
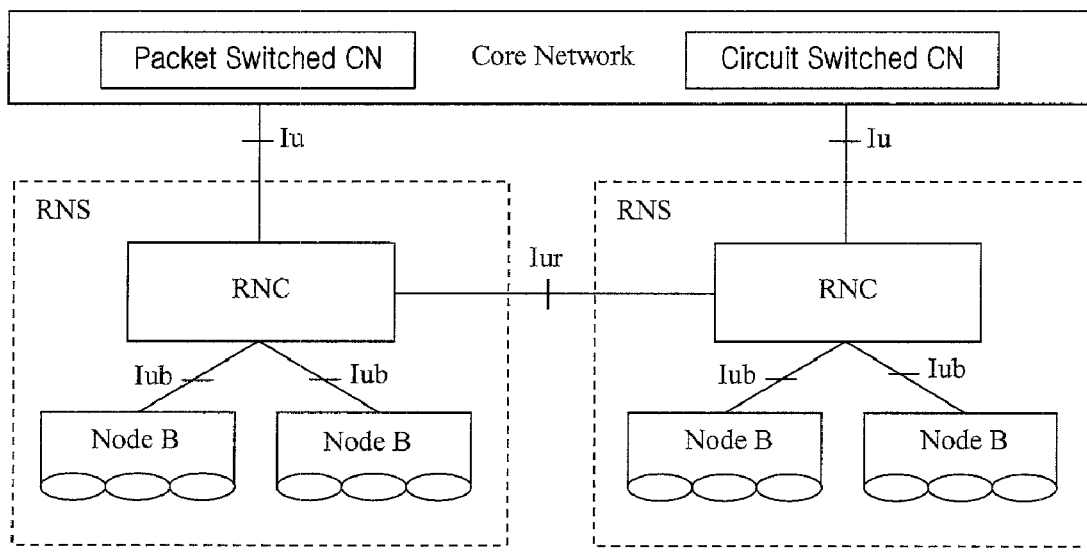
FIG. 2 shows a more detailed known UTRAN network architecture.
Figure 3:
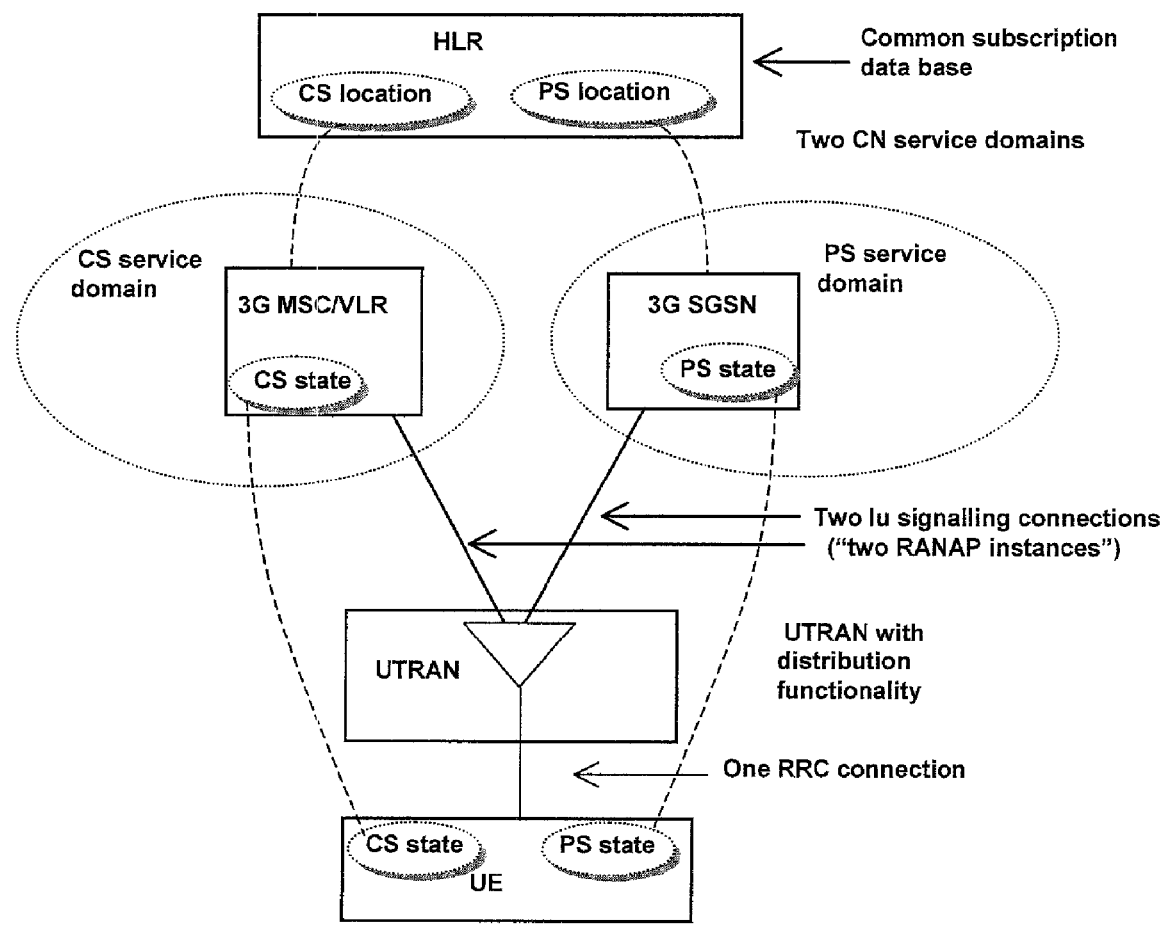
FIG. 3 shows an overview of the known UE registration and connection principles within UMTS.
Figure 4:
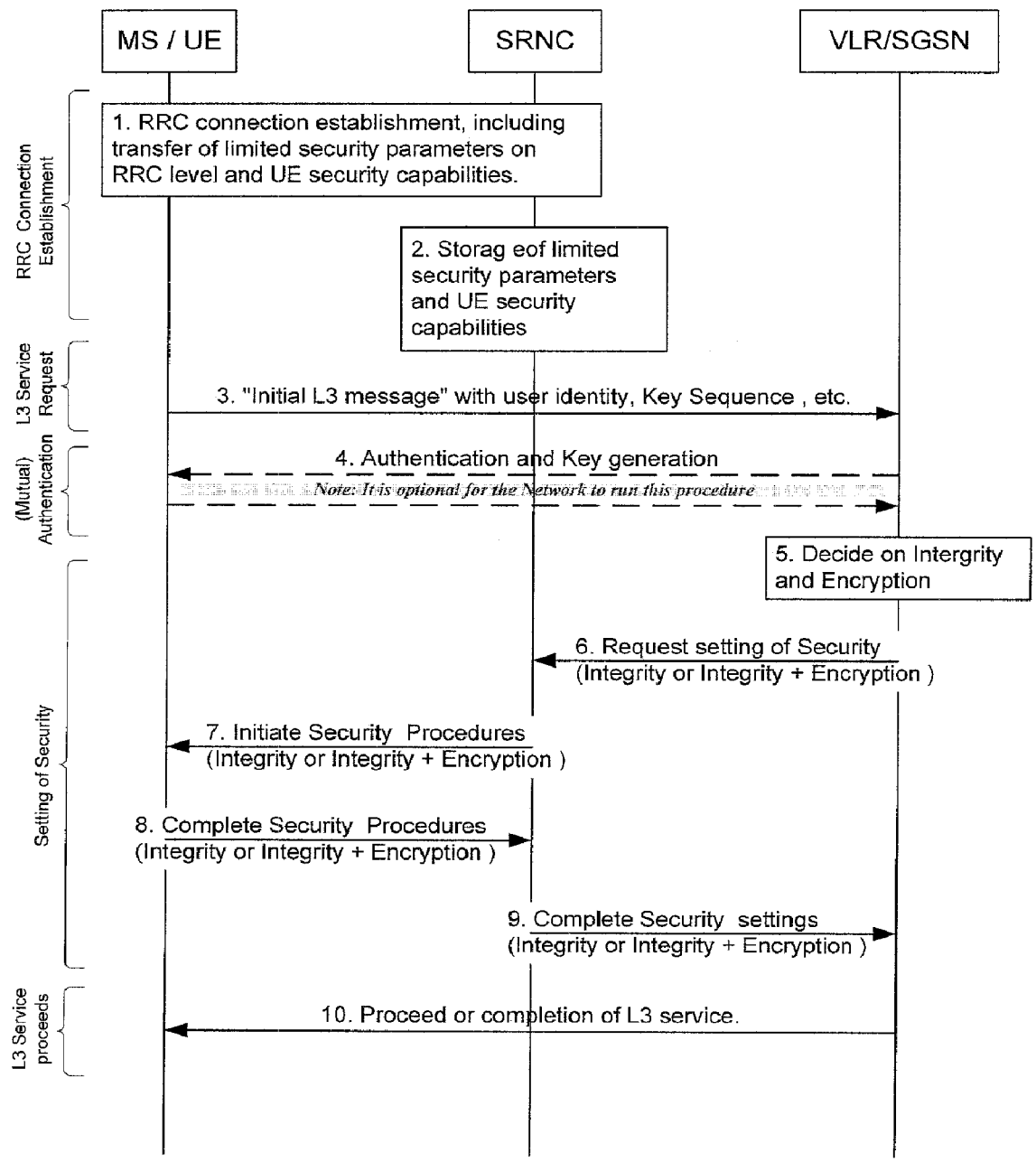
FIG. 4 shows a sequence of known procedural events leading to an integrity protected radio interface.

A first embodiment of the present invention will now be described. When a UE receives a value for parameter T3302 in a non integrity-protected OTA message, for example, in the ATTACH_REJECT or ROUTING_AREA_UPDATE_REJECT messages, the UE does not implement that parameter value. Instead, the UE uses a pre-determined value that is known to be secure.

That is, the UE will use either

A) the currently used value of T3302, such as a value previously implemented upon receipt of an integrity-protected OTA message or the default value if an updated value has not been previously implemented by a received integrity-protected OTA message, or B) the default value of T3302.

The choice of whether option A or B is implemented is a predetermined option, and is built into the software of the UE.

This procedure is shown in FIG. 6, wherein the UE starts the registration procedure at step S601. A hacker then sends a non integrity-protected message, which includes a value for the T3302 parameter, to the UE, as shown at step S603.

At step S605, the UE uses a predetermined value for the parameter T3302 that is stored within the UE.

The UE then either moves to step S607 or step S609 depending on which solution is implemented in the software of the UE.

For option A, at step S607, the UE ignores any parameter values for T3302 in the non integrity-protected message and uses its currently used value for that parameter instead. The currently used value may be either its default value or a value set when receiving a previous integrity-protected OTA message.

For option B, at step S609, the UE always uses its default parameter value for T3302.

The procedure then ends at step S611.

As this first embodiment of the invention is implemented using a UE based solution, the software of UEs needs upgrading. New UEs may be upgraded prior to sending the UEs out to the customer. For existing UEs that are already in operation in the field, introducing this solution will either require a recall of those UEs or an "Over-the-Air" software upgrade.

Second Embodiment

This second embodiment of the present invention is used in conjunction with the first embodiment.

In addition to the features of the first embodiment, the network is not permitted to provide a value for T3302 in any non integrity-protected OTA message. If such an update is provided in any such non integrity-protected OTA messages, for example by a hacker, it shall not be implemented by the UE. That is, the UE will carry out the method as described above in accordance with the first embodiment.

It will be understood that, in order to implement this embodiment, new network releases can readily adopt this solution. However, for existing earlier network releases, it will be necessary to roll out a software fix to operational network node(s).

As in the first embodiment, an upgrade to any older UE software will be required.

Third Embodiment

This third embodiment is used in combination with the first embodiment described above. In this embodiment, the network is mandated to always provide a valid value for T3302 upon completion of registration or registration update.

A network would not be aware of any previous successful attacks on the parameter value for T3302, and so when a UE connects to the network the corrupted value for T3302 may still be set in the UE.

Therefore, in this embodiment, the network provides a valid parameter value for T3302 in the ATTACH_ACCEPT and the ROUTING_AREA_UPDATE_ACCEPT messages being sent to the UE after registration is completed. Thus, even if a hacker has corrupted the UE's version of T3302 and so changed the timer parameter prior to a successful registration, the genuine network, upon accepting the registration attempt and/or the registration update, will refresh the parameter value in T3302 to a valid value.

As the above-described embodiment mandates the network to refresh potentially corrupted information in the UE, the necessary changes are completely on the network side. Therefore, this embodiment is effective even for already existing operational UEs. No upgrades are required to these operational UEs. However, both existing and new networks will require an update to implement the change.

It will be understood that embodiments of the present invention are described herein by way of example only, and that various changes and modifications may be made without departing from the scope of the invention.

It will be understood that the present invention can be extended to cover any crucial information, timers or parameters that are sent to a UE in a non integrity-protected OTA message, which, if said information, timers or parameters are corrupted by a hacker, will result in a Denial of Service attack.

It will further be understood that the invention may be applied to any messages being received by the mobile communication device that are not secure.

The invention claimed is:

1. A method of operating a mobile communication device in a mobile telecommunication network, the method comprising the steps of the mobile communication device:
   receiving a non integrity-protected message with a parameter value included therein to be implemented on the mobile communication device;
   using a predetermined value stored on the mobile communication device instead of the parameter value received.

2. The method of claim 1, wherein the predetermined value is the mobile communication device's default value of the parameter.

3. The method of claim 1, wherein the predetermined value is a value of the parameter currently being used by the mobile communication device.

4. The method of claim 1 further comprising the step of the network providing non integrity-protected messages without the parameter value.

5. The method of claim 1 further comprising the step of the network providing to the mobile communication device the parameter value in an integrity-protected message once the mobile communication device has completed registration, and said mobile communication device implementing the parameter value received in the integrity-protected message.

6. The method of claim 1, wherein the non integrity-protected message includes a parameter value associated with a timer, said timer determining how long the mobile communication device must wait prior to a further attempt to register itself to the network.

7. A method of communicating over a mobile communication network using an air interface to communicate with a mobile communication device, in which integrity-protected and non integrity-protected messages are transmitted to the mobile communication device, said messages including parameter values to be implemented at the mobile communication device, the method comprising the step of:
   ensuring the mobile communication device uses a valid value for the parameter, the valid value allowing communication over the network to continue.

8. A mobile communication device adapted to carry out the method of claim 1.

* * * * *